United States Patent
Maganda (10) Patent No.: US 10,034,568 B2
(45) Date of Patent: Jul. 31, 2018

(54) HEAT DISTRIBUTION APPARATUS

(71) Applicant: Luis Alberto Maganda, Las Vegas, NV (US)

(72) Inventor: Luis Alberto Maganda, Las Vegas, NV (US)

( * ) Notice: Subject to any disclaimer, the term of this patent is extended or adjusted under 35 U.S.C. 154(b) by 30 days.

(21) Appl. No.: 14/920,682

(22) Filed: Oct. 22, 2015

(65) Prior Publication Data

US 2016/0113430 A1 Apr. 28, 2016

Related U.S. Application Data

(60) Provisional application No. 62/122,626, filed on Oct. 27, 2014.

(51) Int. Cl.
*A47J 27/02* (2006.01)
*A47J 27/026* (2006.01)
*A47J 27/00* (2006.01)
*A47J 36/36* (2006.01)
*A47J 36/06* (2006.01)

(52) U.S. Cl.
CPC .......... *A47J 27/026* (2013.01); *A47J 27/002* (2013.01); *A47J 36/36* (2013.01); *A47J 36/06* (2013.01)

(58) Field of Classification Search
CPC ........ A47J 27/002; A47J 27/026; A47J 36/36; A47J 36/06
USPC ......... 220/573.1, 608, 670, 673, 912, 573.2; 165/56
See application file for complete search history.

(56) References Cited

U.S. PATENT DOCUMENTS

| | | | | |
|---|---|---|---|---|
| 2,014,931 A | * | 9/1935 | Genovar, Jr. | A47J 37/10 126/390.1 |
| 5,564,589 A | * | 10/1996 | Fu | A47J 27/002 220/573.1 |
| 2005/0040171 A1 | * | 2/2005 | Alim | A47J 27/002 220/573.1 |
| 2010/0025410 A1 | * | 2/2010 | Chiu | A47J 27/022 220/573.1 |
| 2012/0060819 A1 | * | 3/2012 | Hunt | A47J 36/2477 126/1 R |
| 2014/0353316 A1 | * | 12/2014 | Lin | A47J 36/10 220/573.1 |

\* cited by examiner

*Primary Examiner* — J. Gregory Pickett
*Assistant Examiner* — Elizabeth Volz (57) ABSTRACT

A heat distribution apparatus uniformly distributes heat and air for efficient cooking and retention of heat. The apparatus includes an inner container containing an object requiring heating, such as food and water. The inner container includes a closed end to receive heat, an open end, a sidewall having an inner surface and an outer surface, and a cavity. The sidewall extends between the closed and open ends. The outer surface of the sidewall includes a heat absorption portion fabricated from a material efficacious for absorbing heat. The outer surface includes a heat guidance portion spiraling between the open and closed ends of the inner container for funneling heat and air. An outer cylinder encompasses the inner container. A gap forms between the inner container and outer cylinder. Heat and air flow through the gap and out a vent portion in the outer cylinder.

20 Claims, 4 Drawing Sheets

HEAT DISTRIBUTION APPARATUS

CROSS-REFERENCE TO RELATED APPLICATIONS

The present Utility patent application claims priority benefit of the U.S. provisional application for patent Ser. No. 62/122,626 entitled "HYBRID COOKWARE", filed on 27 Oct. 2014 under 35 U.S.C. 119(e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

An embodiment of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to a heat distribution apparatus that utilizes a gap between two container walls, protruding heat distribution components, and vents for uniform distribution of heat. More particularly, the invention relates to a heat distribution apparatus that provides an inner container configured to receive an object for heating and having protruding heat distribution components, and an outer cylinder that surrounds the inner container having vents, whereby a gap forms between the inner container and the outer cylinder to enable circulation of air and heat.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that cookware is a type of food preparation container, commonly found in a kitchen. Cookware comprises cooking vessels, such as saucepans and frying pans, intended for use on a stove or range cooktop.

It is known in the art that stainless steel cookware often does not heat evenly over the entire cooking surface. The areas of the stainless steel surface in direct contact with the heat source become hotter than the areas of the stainless steel surface not in direct contact with the heat source. As a result, food items are not heated and cooked evenly and can burn.

It is known in the art to make perforations in a stainless steel plate to allow the aluminum, which is a good thermal conductor, to be flush with the surface of the stainless steel, whose electromagnetic properties favor induction heating. The vapors from the cooking food can also vent through the perforations.

Typically, aluminum is a good material for the warming tray because of its relative light weight and high coefficient of thermal conductivity. In recent times, however, aluminum has fallen into disfavor for use as a food contacting surface in the commercial food preparation industry. However, even with these properties, after a duration, the food inside the aluminum cookware cools if not kept under a heat source.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, is well settled law, as early as 1939, that words of approximation are not indefinite in the claims even when such limits are not defined or specified in the specification.

For example, see *Ex parte Mallory,* 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight data aperture of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.,* Civ. App. 96-1264, slip op. at 10 (Fed. Cir. Jul. 3, 1997) (unpublished) *Hybridtech* v. *Monoclonal Antibodies, Inc.,* 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.,* 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.,* 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, term 'substantially' is well recognize in case law to have the dual ordinary meaning of connoting a term of approximation or a term of magnitude. See *Dana Corp.* v. *American Axle & Manufacturing, Inc.,* Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.,* 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.,* 347 F.3d 1314, 1322 (Fed. Cir. 2003); *Epcon Gas Sys., Inc.* v. *Bauer Compressors, Inc.,* 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. *In Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see *Pall Corp.* v. *Micron Seps.*, 66 F.3d 1211, 1217, 36 USPQ2d 1225, 1229 (Fed. Cir. 1995); see, e.g., *Andrew Corp.* v. *Gabriel Elecs. Inc.*, 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see *Ex parte Mallory*, 52 USPQ 297, 297 (Pat. Off. Bd. App. 1941) where, for example, the court said "the claims specify that the film is "substantially" eliminated and for the intended purpose, it is believed that the slight data aperture of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

There are various types of heat distribution apparatuses that enable efficient cooking that may be provided by preferred embodiments of the present invention. In one embodiment of the present invention, a heat distribution apparatus is configured to cook food while distributing heat and air uniformly around the food. This enables the apparatus to provide efficient heating techniques for cooking and longer heat retention times after a heat source has been removed.

In some embodiments, the apparatus may include an inner container configured to contain an object requiring heat, such as food and water. The inner container may include a closed end, an open end, a sidewall having an inner surface and an outer surface, and a cavity. The sidewall may extend between the closed end and the open end. In some embodiments, the closed end may be configured to engage a heat source. The heat source may impart heat on the closed end, causing thermal energy to travel along the sidewall to heat the object in the cavity of the inner container. Air is also formed by the heat.

In some embodiments, the outer surface of the sidewall may include a heat absorption portion. The heat absorption portion may include a plurality of protrusions that protrude from the outer surface in a spaced apart disposition. The protrusions may be fabricated from a material efficacious for absorbing heat. In some embodiments, the outer surface of the sidewall may further include a heat guidance portion. The heat guidance portion may include a protruding helix that spirals between the open end and the closed end of the inner container. The helical configuration of the heat guidance portion enables heat and air to circulate uniformly around the inner container, and heat and air to be carried from the closed end towards the open end along the outer surface of the sidewall.

In some embodiments, the apparatus may include an outer cylinder that is configured to encompass the sidewalls of the inner container. The outer cylinder has a diameter slightly larger than the inner container, such that a gap forms between the inner container and the outer cylinder. The outer cylinder may extend between the open end and closed end of the inner container. The outer cylinder may include a first end that encompasses the open end of the inner container, and a second end that encompasses the closed end of the container. The first end may include a vent portion. The vent portion may include a plurality of spaced-apart holes that enable passage of heat and air out of the gap. The vent portion may serve to encourage the heat formed at the closed end to rise towards the open end of the container.

In some embodiments, the gap enables passage of the heat generated at the closed end of the inner container. The heat absorption portion may maintain the heat in the inner container after the heat source removed. The heat guidance portion may carry the heat and air towards the vent portion for uniform distribution of heat and exhaust.

Figure 1:
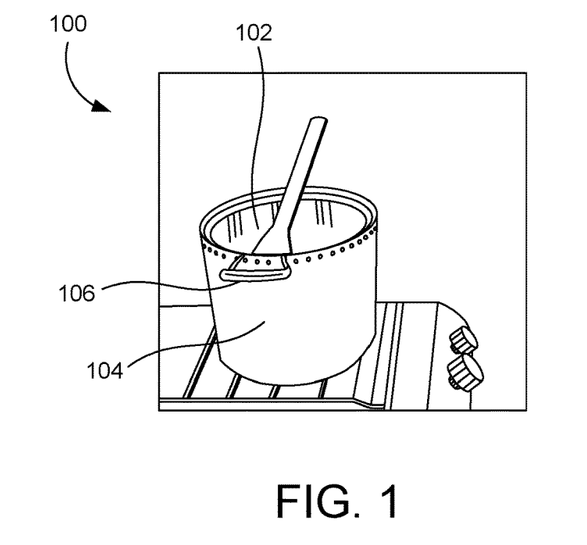
FIG. 1 illustrates a perspective view of an exemplary heat distribution apparatus receiving heat and cooking an object, in accordance with an embodiment of the present invention.

FIG. 1 illustrates a perspective view of an exemplary heat distribution apparatus receiving heat and cooking an object. In one aspect, a heat distribution apparatus 100 is configured to uniformly distribute heat and air for efficient cooking and retention of heat. The apparatus operates by channeling heat and air along its surfaces. The apparatus also absorbs heat, so that the contained object remains warm even after a heat source has been removed. This even distribution of heat and air, and absorption of heat, enables the apparatus to provide efficient heating techniques for cooking and longer heat retention times after a heat source has been removed.

In some embodiments, the apparatus may include an inner container 102 configured to contain an object that requires heat. The object may include, without limitation, food and water. The inner container may have a generally cylindrical shape. Though in other embodiments, the inner container may also include a rectangular shape, a pyramid shape, and a cubicle shape. At least one handle 106 may extend from near the open end of inner container to enable facilitated manipulation of the apparatus.

The apparatus may further include an outer cylinder 104 that is sized and dimensioned to encompass the inner container. The outer cylinder has a diameter slightly larger than the inner container, such that a gap forms between the inner container and the outer cylinder. The gap is efficacious for enabling heat and air to flow. Thus, the gap and other components described below create a uniform distribution of heat and air, such that the object is heated more uniformly.

In some embodiments, the inner container is conducive to receiving and transferring heat. The outer cylinder serves as a barrier to help conduct and channel the heat and air. The generated heat produces vapors that flow between the inner container and outer cylinder. This generated heat and air may flow towards an opening in the inner container and vent away from the apparatus. This directional distribution of heat and air enhances heating, and specifically cooking. Thus in one embodiment, the apparatus may operate in many ways substantially the same as cookware. Suitable materials for the inner container and the outer cylinder may include, without limitation, stainless steel, iron, aluminum, metal alloys, clay, and fiberglass.

In the half-inch (½") gap about the circumference between this cooking vessel and its cylindrical column is a multitude of internal rods are attached to the external side of the cooking vessel and project outward within the half-inch (½") gap.

Figure 2:
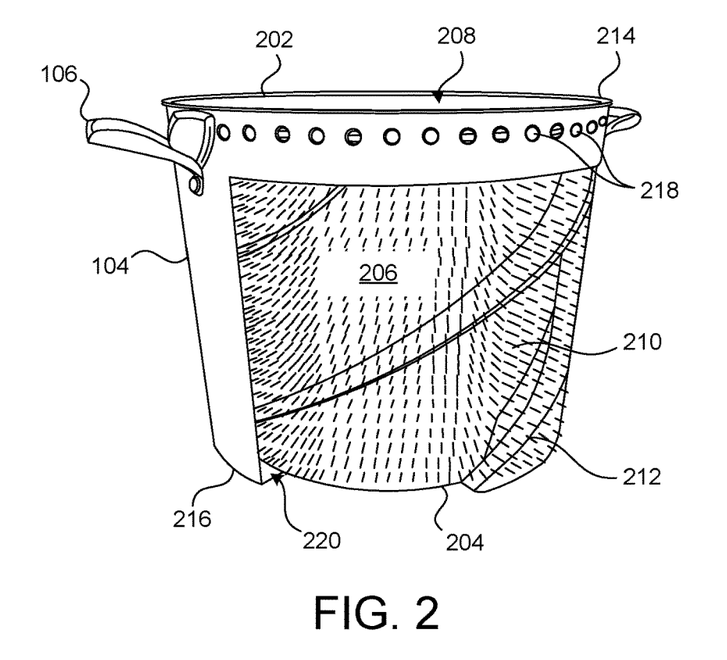
FIG. 2 illustrates a sectioned view of an exemplary inner container having an exemplary heat absorption portion and an exemplary heat guidance portion, positioned inside an exemplary outer cylinder, in accordance with an embodiment of the present invention.

FIG. 2 illustrates a sectioned view of an exemplary inner container having an exemplary heat absorption portion and an exemplary heat guidance portion, positioned inside an exemplary outer cylinder. In one aspect, the inner container may include a closed end 204, an open end 202, a sidewall 206 having an inner surface and an outer surface, and a cavity 208. The sidewall may extend between the closed end and the open end. In some embodiments, the closed end may be configured to engage a heat source. The heat source may impart heat on the closed end, causing thermal energy to travel along the sidewall to heat the object in the cavity of the inner container. The heat source may include, without limitation, an oven, a stove top, a fire, and a grill.

In some embodiments, the outer surface of the sidewall may include a heat absorption portion 210. The heat absorption portion may include a plurality of protrusions that protrude from the outer surface in a spaced apart disposition. The protrusions may be fabricated from a material efficacious for absorbing heat. In one embodiment, the protrusions are spikes fabricated from stainless steel. The heat absorption portion may capture heat as it whirls around the inner container and transport this heat directly to the cavity for enhanced cooking. Consequently, the object remains hot, even after the heat source has been removed from the closed end of the inner container.

In some embodiments, the outer surface of the sidewall may further include a heat guidance portion 212. The heat guidance portion may include a protruding helix that spirals between the open end and the closed end of the inner container. The helical configuration of the heat guidance portion enables heat and air to circulate uniformly around the inner container, and heat and air to be carried from the closed end towards the open end along the outer surface of the sidewall. In one embodiment, the heat guidance portion is a spiraling track of ½" width that travels around the full circumference of the sidewall. The heat guidance portion may cause the rising heat to whirl around the exterior of the inner container and maintain contact with the inner container for a prolonged duration. Those skilled in the art will recognize that this uniform distribution of heat causes food to heat evenly, faster, and maintain heat longer.

In some embodiments, the outer cylinder is configured to encompass the sidewalls of the inner container. The outer cylinder may extend between the open end and closed end of the inner container, such that a gap 220 forms between the sidewall and the outer cylinder. The gap is sized such that heat, and air, such as vapor from the cavity of the inner container may freely circulate. In one embodiment, the gap is ½" wide.

The outer cylinder may include a first end 214 that encompasses the open end of the inner container, and a second end 216 that encompasses the closed end of the container. In some embodiments, the inner container may remain at a fixed position relative to the outer cylinder. Though in other embodiments, the inner container may be incrementally moved along the length of the inner container. In either case, the gap forms there between for heat and air to pass through.

The first end may include a vent portion 218. The vent portion may include a plurality of spaced-apart holes that enable passage of heat and air out of the gap. In one embodiment, the vent portion may include ½" diameter holes in an even spatial distribution. The vent portion may serve to encourage the heat formed at the closed end to rise towards the open end of the container. In one embodiment, the vent portion allows rising heat to escape from the apparatus, which in turn causes the rising heat to flow faster through the gap, from the closed end to the open end of the inner container. In essence, the fast swirling heat rapidly heats the inner container, which in turn cooks food faster.

Figure 3:
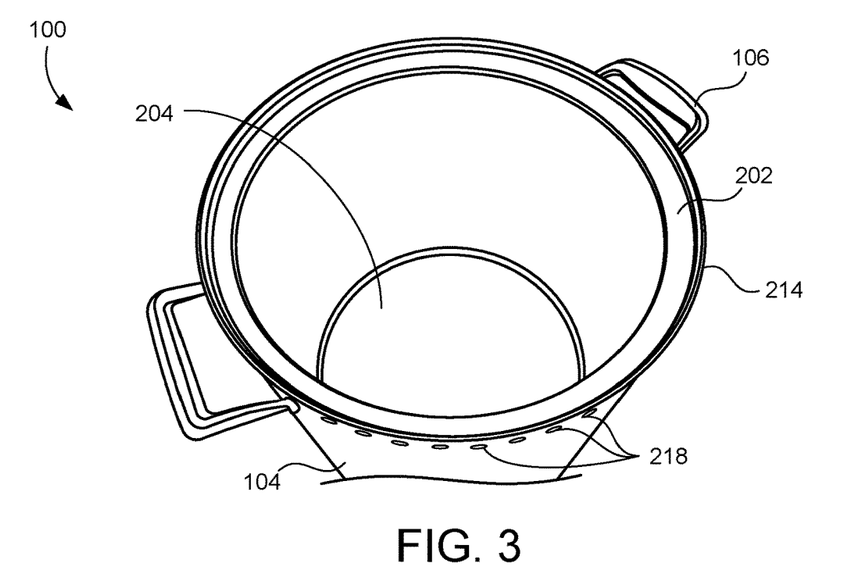
FIG. 3 illustrates a top side perspective view of a heat distribution apparatus, showing a cavity in an inner container, in accordance with an embodiment of the present invention.

FIG. 3 illustrates a top side perspective view of a heat distribution apparatus, showing a cavity in an inner container. In one aspect, the apparatus operates substantially the same as general cookware known in the art. The apparatus may be placed on top of a heat source, such as a stove burner. After a duration, the generated heated air flows through the gap between the inner container and outer cylinder. At the outer surface of the sidewall, the heat will encounter the heat guidance portion. The generally helical shape of the heat guidance portion enables the flowing heat to flow around the inner container. This helical motion allows the heat to stay in contact with the inner container longer so for absorbing more heat from the flowing air.

Figure 4:
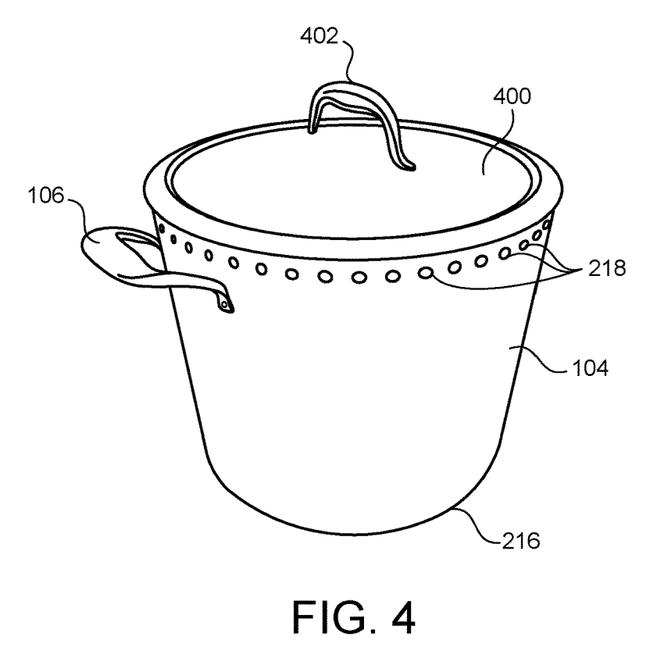
FIG. 4 illustrates a perspective of an exemplary lid covering an open end of an inner container, in accordance with an embodiment of the present invention.

FIG. 4 illustrates a perspective of an exemplary lid covering an open end of an inner container. In one aspect, the open end of the inner container is open to enable passage of the object into the cavity. It may be advantageous to close the open end with a lid 400. The lid may include a panel that is sized and dimensioned to fit over the open end of the inner container. In one embodiment, the lid has a 10" diameter. The lid also covers the gap between the inner container and the outer cylinder. A lid handle 402 may be used to manipulate the lid. In one alternative embodiment, the lid is conical shaped.

Figure 5:
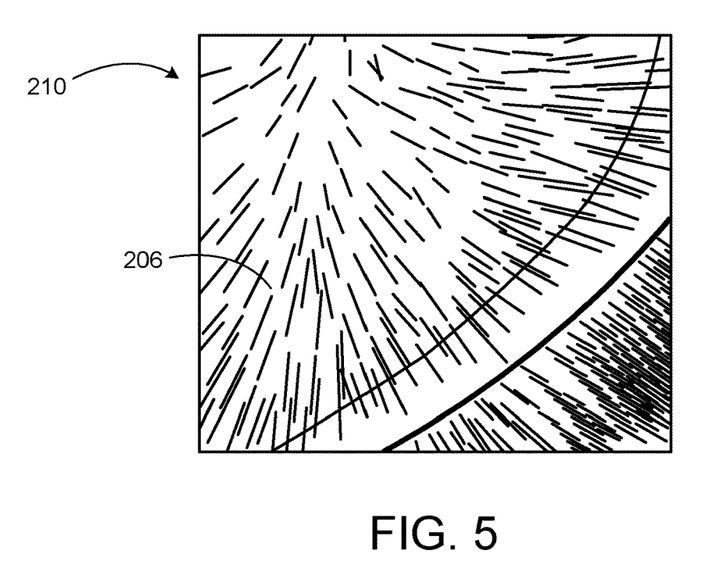
FIG. 5 illustrates a close up view of a heat absorption portion and a heat guidance portion on a sidewall of an inner container, in accordance with an embodiment of the present invention.

FIG. 5 illustrates a close up view of a heat absorption portion and a heat guidance portion on a sidewall of an inner container. In one aspect, the unique heat distribution and absorption capacity of the apparatus may enable the absorption and distribution of heat through at a rate that is approximately seventy percent superior to conventional cookware. This not only increases the duration that food may be stored without a heat source, but also reduces the need to stir food, as the uniformly distributed heat cooks the food more efficiently.

Figure 6:
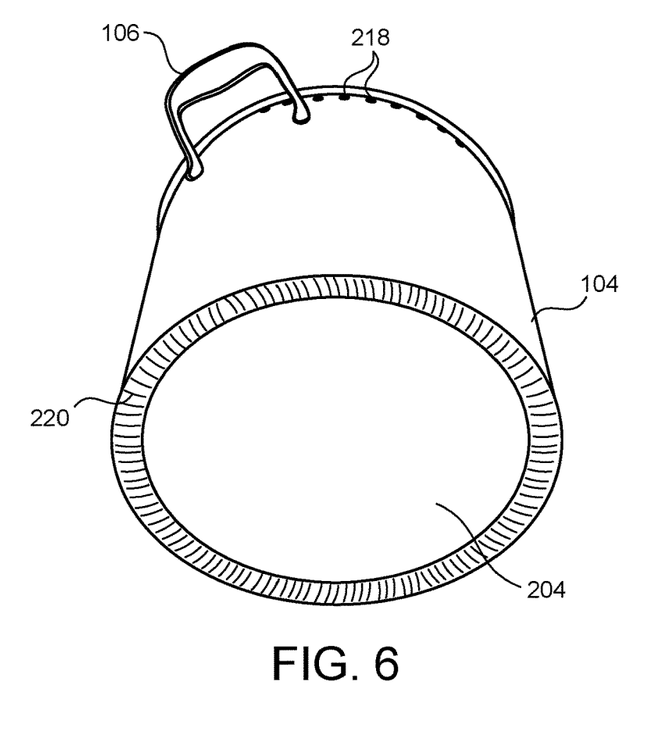
FIG. 6 illustrates a bottom perspective view of a heat distribution apparatus, showing a closed end of an inner container, in accordance with an embodiment of the present invention.

FIG. 6 illustrates a bottom perspective view of a heat distribution apparatus, showing a closed end of an inner container. In one aspect, the apparatus may have variations in which the inner container is separate from the surrounding outer cylinder, and in which the inner container would rest atop the outer cylinder only with partial insertion within the outer cylinder. In such variations, the depth of insertion of the inner container within the outer cylinder may vary. In another embodiment, the inner container may have multiple levels of insertion depth within the outer cylinder.

Figure 7:
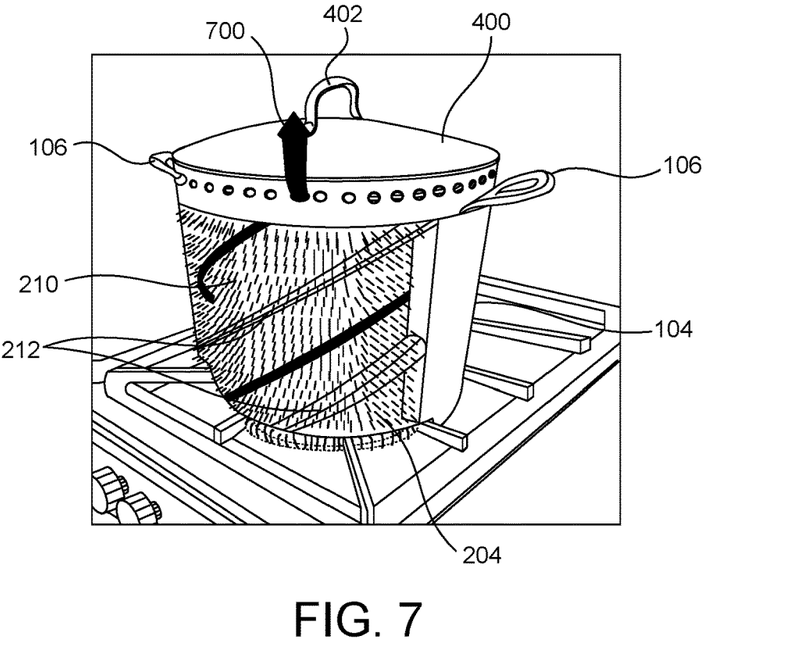
FIG. 7 illustrates a perspective view of a heat distribution apparatus distributing heat from a closed end of an inner container to a vent portion of an outer cylinder, in accordance with an embodiment of the present invention.

FIG. 7 illustrates a perspective view of a heat distribution apparatus distributing heat from a closed end of an inner container to a vent portion of an outer cylinder. In one aspect, heat 700 is generated at the heat source and channeled through the gap, towards the open end of the inner container, and the first end of the outer cylinder. The heat may create air from vapors that form inside the inner container. Those skilled in the art will recognize that food and water generate vapor. The vapor is also channeled by the spiraling effect of the heat guidance portion. The heat and air finally exit through the vent portion in the outer cylinder.

The vent portion allows rising heat to escape from the apparatus, which in turn causes the rising heat to flow faster through the gap, from the closed end to the open end of the inner container. The heat guidance portion helps guide the heat and air towards the vent portion. In essence, the fast swirling heat rapidly heats the inner container, which in turn cooks food faster. The red arrows in FIG. 7 indicate the directional flow that the heat will travel in the gap to completely wrap around the inner container as the heat flows to the vent portion.

Figure 8:
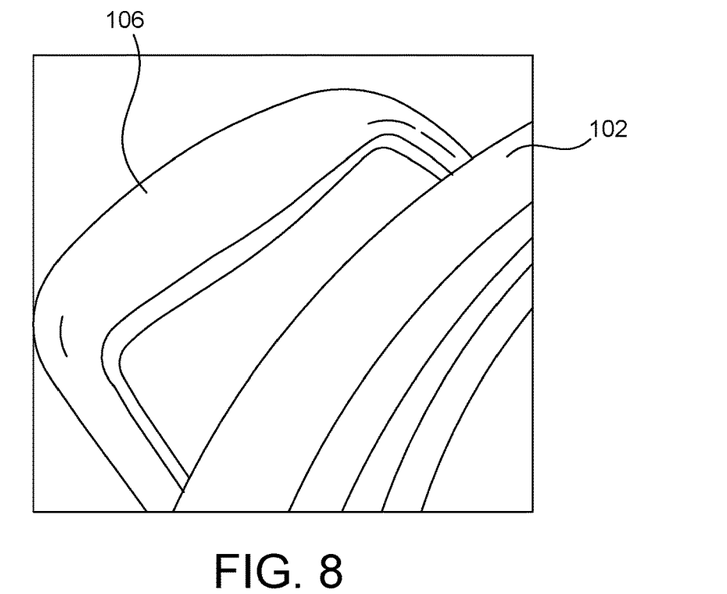
FIG. 8 illustrates a close up view of an exemplary handle on the heat distribution apparatus, in accordance with an embodiment of the present invention.

FIG. 8 illustrates a close up view of an exemplary handle on the heat distribution apparatus. In one aspect, the apparatus may require various manipulations for cooking, cleaning, and serving food. The at least one handle may include two U-shaped members that extend form opposite sides of the open end. In one embodiment, the handle may also be insulated to prevent burning.

In one alternative embodiment, the apparatus may be used for heating chemicals and nonfood objects. In another alternative embodiment, the heat guidance portion may be shaped into vertical bars. In another alternative embodiment, the heat absorption portion is fabricated from clay or other material having a high heat capacity or low conductivity. In another alternative embodiment, the gap, and thereby the outer cylinder, is width adjustable.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support aperture a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the data of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which data of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a heat distribution apparatus that utilizes a gap between two container walls, protruding heat distribution components, and vents for uniform distribution of heat according to the present invention will be apparent to those skilled in the art. Various aspects of the invention have been described above by way of illustration, and the specific embodiments disclosed are not intended to limit the invention to the particular forms disclosed. The particular implementation of the ornamental cover that covers a heat distribution apparatus that utilizes a gap between two container walls, protruding heat distribution components, and vents for uniform distribution of heat may vary depending upon the particular context or application. By way of example, and not limitation, the a heat distribution apparatus that utilizes a gap between two container walls, protruding heat distribution components, and vents for uniform distribution of heat described in the foregoing were principally directed to a heat distribution apparatus that enables efficient cooking through an inner container for cooking having protruding heat distribution components, and outer cylinder having vents that surrounds the inner container; however, similar techniques may instead be applied to spinning of a variety of liquids that are susceptible to formation of air bubbles, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
   an inner container implement, said inner container implement comprising:
      an open end portion,
      a closed end portion,
      a sidewall section, and
      a cavity portion,
      a surface of said closed end portion is configured to receive heat, in which said sidewall section having an inner surface portion and an outer surface portion, wherein said sidewall section is configured to conduct said heat from said closed end surface, and wherein said cavity portion being configured to enable containment of an object;
   a heat absorption portion, in which said heat absorption portion comprises at least a plurality of protrusions that protrude from said outer surface portion of said sidewall section in a spaced apart disposition, wherein said heat absorption portion is configured to at least partially absorb said heat;

a heat guidance portion, in which said heat guidance portion comprises a protruding helix structure that spirals between said open end portion and said closed end portion of said inner container implement, wherein said protruding helix structure is operable to enable heat or air to circulate uniformly around said inner container implement;

an outer cylinder, said outer cylinder comprising:
   a first end portion, wherein said first end portion is disposed proximal to said open end portion of said inner container,
   a second end portion, wherein said second end portion is disposed proximal to said closed end portion of said inner container, and
   a vent portion, wherein said vent portion is disposed proximal to said first end portion of said outer cylinder, and wherein said vent portion comprises a plurality of spaced-apart holes configured to enable a passage of heat or air,
   said outer cylinder configured to at least partially encompass said inner container implement, whereby a gap portion forms between said outer cylinder and said inner container implement;

a handle implement, in which said handle implement comprises at least two handles disposed on opposite sides proximate said first end portion; and a lid implement, in which said lid implement is operable to cover said open end portion of said inner container implement without covering said vent portion.

2. The apparatus of claim 1, wherein said inner container implement has a generally cylindrical shape.

3. The apparatus of claim 2, wherein said inner container implement is fabricated from stainless steel.

4. The apparatus of claim 3, wherein said inner container implement comprises dimensions of 7½ inches in diameter by 10 inches in height.

5. The apparatus of claim 4, wherein said lid implement comprises at least one handle that is operable for manipulating said lid implement.

6. The apparatus of claim 5, wherein said closed end portion receives seat heat from a heat source.

7. The apparatus of claim 6, wherein said heat source produces said heat and air.

8. The apparatus of claim 7, wherein said heat and air flow through said gap portion.

9. The apparatus of claim 8, wherein said lid implement comprises a stainless steel lid implement.

10. The apparatus of claim 9, wherein said lid implement comprises a U-shaped lid handle.

11. The apparatus of claim 10, wherein said U-shaped lid handle comprises an insulator that is operable for preventing burning.

12. The apparatus of claim 11, wherein said heat absorption portion further comprises a plurality of rod segments.

13. The apparatus of claim 12, wherein said plurality of rod segments are configured to protrude from said outer surface portion of said sidewall section.

14. The apparatus of claim 13, wherein said heat guidance portion comprises a low conductivity material implement.

15. The apparatus of claim 14, wherein said heat guidance portion is disposed to protrude from said outer surface portion of said sidewall section.

16. The apparatus of claim 15, wherein said heat guidance portion spirals are at a ½ inch width around said inner container implement.

17. The apparatus of claim 16, wherein said vent portion comprises ½ inch diameter holes disposed in an even spatial distribution around said first end portion of said outer cylinder.

18. The apparatus of claim 17, wherein said gap portion is width adjustable.

19. An apparatus consisting essentially of:
means for absorbing heat from a heat source;
means for containing an object;
means for encompassing said object containment means;
means for forming a gap between said containment means and said encompassing means;
means for absorbing heat into said containment means;
means for channeling heat through said gap means and along said containment means;
means for venting heat away from said apparatus;
means for covering said object containing means without covering said heat venting means.

20. An apparatus consisting essentially of:
an inner container, said inner container comprising:
   an open end,
   a closed end,
   a sidewall,
   a cavity, and
   a handle implement, wherein said handle implement comprises at least two handles being configured to prevent burning during a manipulation of said apparatus;
   said inner container defined by a generally cylindrical shape;
   wherein a surface of said closed end is configured to receive heat, said sidewall having an inner surface and an outer surface, said sidewall is configured to conduct said heat from said closed end surface, said cavity configured to enable containment of an object;
a plurality of rods, said plurality of rods disposed to position on said outer surface of said sidewall, said plurality of rods configured to at least partially absorb said heat;
a helix, said helix disposed to position on said outer surface of said sidewall, said helix further disposed to extend between said closed end and said open end of said container, said helix configured to help channel said heat from said closed end to said open end of said inner container;
an outer cylinder, said outer cylinder comprising:
   a first end,
   a second end, and
   a plurality of evenly spaced-apart holes,
   said outer cylinder defined by a generally cylindrical shape said outer cylinder configured to at least partially encompass said inner container, whereby a gap forms between said outer cylinder and said inner container, said first end disposed proximal to said open end of said inner container, said second end disposed proximal to said closed end of said inner container, said plurality of evenly spaced-apart holes disposed proximal to said first end of said outer cylinder, said plurality of evenly spaced-apart holes configured to enable passage of said heat;
a lid implement, said lid configured to at least partially cover said open end of said inner container without covering said plurality of evenly spaced-apart holes;

a lid handle, wherein said lid handle is configured to be operable for manipulating said lid implement;

a handle implement, in which said handle implement comprises at least two handles disposed on opposite sides proximate said first end portion.

* * * * *